L. B. BUCHNER.
LUMINOUS DISPLAY APPARATUS.
APPLICATION FILED NOV. 12, 1920.
1,398,835.
Patented Nov. 29, 1921.
2 SHEETS—SHEET 1.
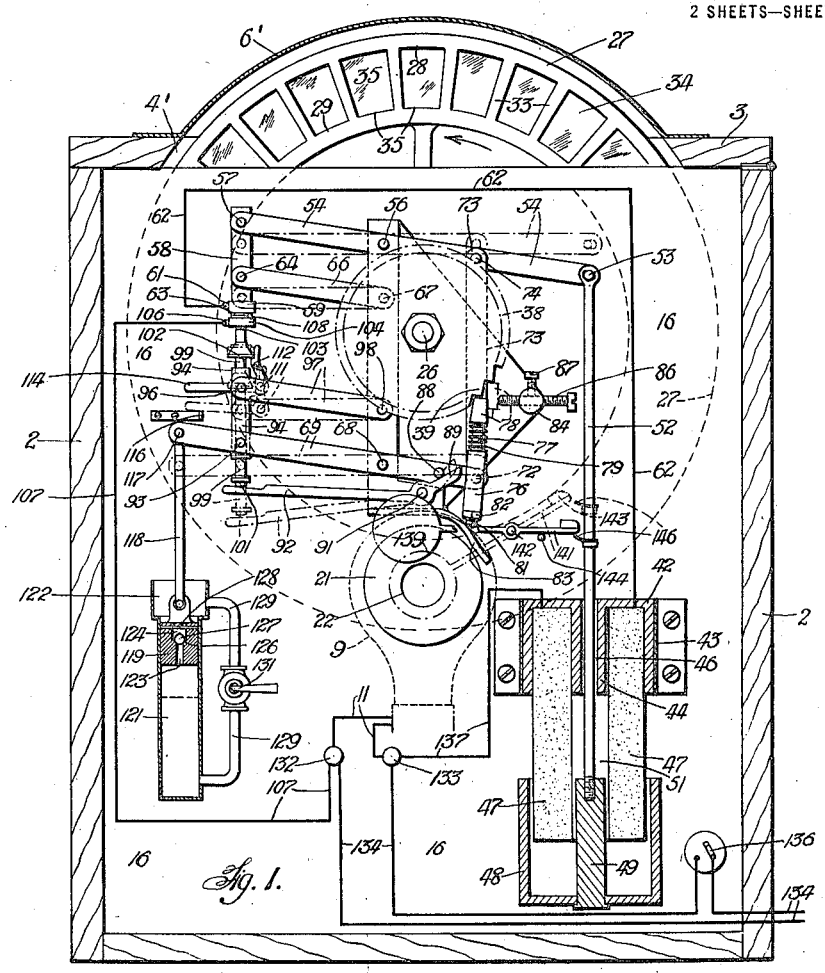
Inventor
L. B. Buchner

L. B. BUCHNER.
LUMINOUS DISPLAY APPARATUS.
APPLICATION FILED NOV. 12, 1920.

1,398,835.

Patented Nov. 29, 1921.
2 SHEETS—SHEET 2.

Inventor.
L. B. Buchner.
by
Atty.

UNITED STATES PATENT OFFICE.

LEOPOLD B. BUCHNER, OF FITZROY, MELBOURNE, VICTORIA, AUSTRALIA.

LUMINOUS DISPLAY APPARATUS.

1,398,835.     Specification of Letters Patent.     Patented Nov. 29, 1921.

Application filed November 12, 1920. Serial No. 423,706.

*To all whom it may concern:*

Be it known that I, LEOPOLD BERNARD BUCHNER, a subject of the King of Great Britain and Ireland, and a resident of the city of Fitzroy, a suburb of the city of Melbourne, in the county of Bourke, State of Victoria, Commonwealth of Australia, (whose post-office address is 397 Brunswick street, in the said city of Fitzroy,) have invented a certain new and useful Improved Luminous Display Apparatus, of which the following is a specification.

This invention relates to apparatus for intermittently displaying illuminated advertisements or other signs or exhibits, wherein a film carrier bearing the signs or pictures to be displayed is intermittently moved before an illuminating medium such as an electric lamp, the luminous exhibit thus produced being enlarged and projected by lenses onto a glass or other suitable display screen which may form the front of the apparatus or may be located at a distance therefrom.

The primary object of the invention is to provide an improved electro-mechanically operated apparatus of the above nature which is positive in action, not unduly complicated or expensive and not liable to easy derangement.

Another object of the invention is to provide a simplified and improved means for adjusting the period of display of each exhibit by means of a dashpot having a bypass and a regulating valve whereby the flow of oil through the bypass from one end of the dashpot cylinder to the other is readily controlled to retard the return movement of an actuating solenoid the core of which is moved by electric energy in one direction to actuate the film carrier and returns to normal position by gravity the period occupied by this return movement governing the period for which each sign or exhibit is displayed.

A further object of the invention is to provide a film carrier having means to detachably retain each film or plate thereon in such a manner that any individual film or plate may be removed and renewed or replaced without in any way interfering with the other films or plates.

A still further object of the invention is to provide a veil screen which is disposed in front of the display screen on which the luminous signs are shown and is adapted to carry an unilluminated advertisement or sign which is exhibited only while the luminous signs are automatically changing or the apparatus is not operating. This intermittent exhibition of the unilluminated sign on the veil screen alternately with the luminous displays is effected by a device which automatically interrupts or shuts off the projection of the light rays from the illuminating medium onto the display screen each time the luminous exhibits are changing. An unilluminated background is thus presented behind the veil screen rendering the sign thereon clearly visible while the light rays are cut off but invisible when the display screen is illuminated.

With the above general objects in view the invention more specifically resides in the construction and arrangement of the various parts as hereinafter described and defined in the appended claims.

Referring to the drawings which form part of this specification:—

Figure 1 is a cross section taken through the box or casing inclosing the apparatus, and showing in full lines a front view of the operative parts of the invention in their normal positions. In broken lines various of such parts are indicated in the position they occupy immediately after the actuating solenoid has been deënergized at the end of its upward or operative stroke.

Fig. 2 is a plan of the rear part of the inclosing box or casing with the cover of the latter removed to show the relative disposition of the lamp house and other parts.

The invention includes a suitable box or casing 2 having a hinged cover 3 which is provided with an opening 4' to pass the upper portion of a film carrier hereinafter described. This opening is covered by an arcuate hood 6' attached to the cover 3. The front end of the box or casing 2 is closed by a glass or other suitable transparent display screen 4 which may be slidably mounted in suitable guides 6 disposed at each side of the casing.

Figure 3:
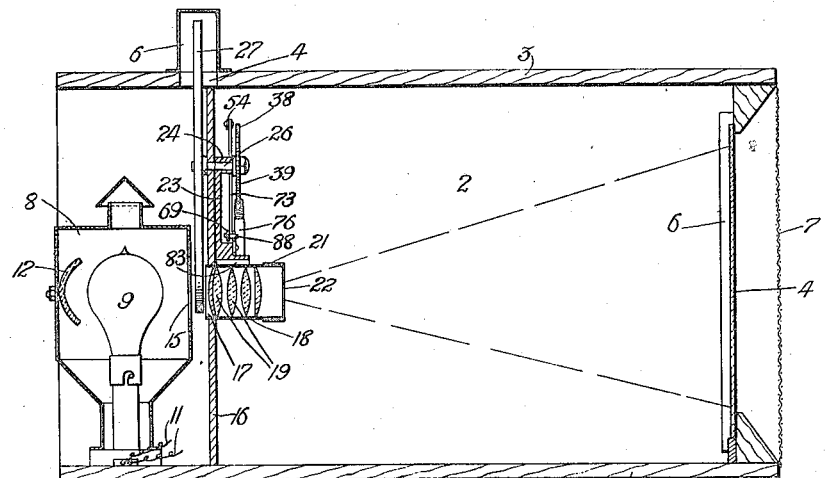
Fig. 3 is a longitudinal section of the invention on a reduced scale parts being omitted for convenience of illustration.
Figure 4:
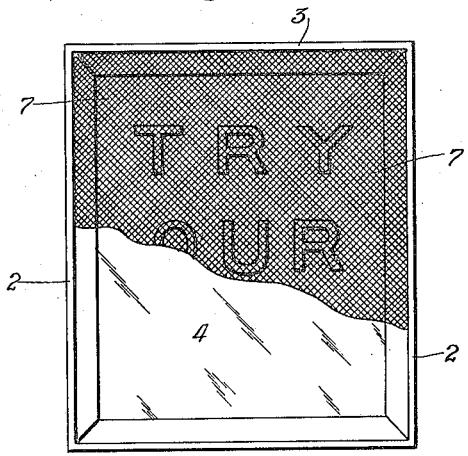
Fig. 4 is a front view of Fig. 3 showing the veil screen on which the unilluminated sign is exhibited. Portion of the veil screen is broken away to show the glass display screen behind it.

Extending across the front end of the casing in front of the glass screen 4 is a veil screen 7. This screen is made of a suitable gauze fabric or the like and as seen in Fig. 4 is adapted to carry an unilluminated advertisement or sign which owing to the texture of the material of which the veil screen is formed, is not visible when the luminous signs are being displayed upon the glass screen 4 and does not interfere with the visibility of the luminous exhibits. The object of the veil screen is as aforesaid to exhibit this unilluminated sign when the luminous signs are being automatically changed or the apparatus is not illuminated.

Disposed within the rear part of the box 2 is a lamp house 8 accommodating a suitable electric lamp 9 which receives electric current through the wires 11. A reflector 12 is mounted within the lamp house behind the lamp 9 to reflect the light forwardly through the lenses hereinafter described. The lamp house is also provided with a front opening 15 which may accommodate a suitable condenser if so desired. The lamp house also has a sliding door 13 by which access may be had to the lamp.

Accommodated by the grooves 14 within the box or casing 2 is a partition 16 through which is an aperture 17 accommodating the rear end of a lens tube 18. This tube holds suitable lenses 19 by which the luminous sign or exhibit is projected onto the display screen 4. The front end of the lens tube 18 is covered by a removable cap 21 having a central hole 22 therethrough by which the pictures or signs are more clearly defined as they are thrown upon the screen.

Figure 5:
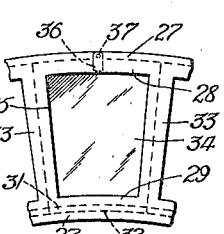
Fig. 5 is an enlarged sectional detail view of part of the film carrier showing a means of detachably holding each individual film or plate thereof in position.
Figure 6:
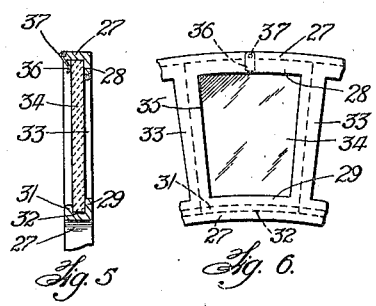
Fig. 6 is a front view of Fig. 5.

Carried by the partition 16 is a bracket 23 carrying a bearing 24 through which passes a film carrier spindle 26. Mounted on this spindle is a film carrier or wheel 27. As seen in Figs. 5 and 6 this carrier may be provided with an outer inturned lip or flange 28 and inner outturned lips or flanges 29 and 31. Formed between the flanges 29 and 31 is an annular film recess 32 which accommodates the inner ends of the transparent films or glass plates 34 which carry the advertisements or exhibits to be displayed. The inner and outer flanges 28 and 29 are bridged by divisional ribs 33 which divide the film carrier into a plurality of openings 35 each of which is occupied by one of the films or glass plates 34. These plates are each detachably and independently held in position by suitable means such for instance as a retaining spring 36 pivoted at 37 to the outer periphery of the film carrier. Thus any individual film or plate may be readily removed from the carrier by merely raising or turning the spring 36 about its pivot whereupon the film or plate may be withdrawn and replaced or substituted by another without interfering with the other plates.

Secured to the film carrier spindle 26 in front of the partition 16 is a ratchet wheel 38 having teeth 39 corresponding in number to the openings 35 of the film carrier.

In combination with the foregoing a solenoid 14 is employed. This is provided with an upper fixed iron jacket 42 secured to the front of the partition 16 by a holding yoke 43. The jacket 42 is provided with an upper fixed core 44 which is provided with a central passage 46. The windings 47 of the solenoid are wound between this core and the jacket 42 as clearly shown in Fig. 1.

The solenoid is also provided with a lower movable iron jacket 48 carrying a lower movable core 49 which passes inside the central core passage 51 of the solenoid. Attached to the core 49 is the lower end of an operating rod 52 the upper end of which is pivoted at 53 to an upper rocking lever 54 which is fulcrumed at 56 upon the bracket 23. Pivoted at 57 to the other end of the rocking lever 54 is an upper contact carrier 58 of fiber or other suitable insulating material. This upper contact comprises a metal ring 59 having a lug 61 to which a conductor 62 leading to one end of the solenoid winding is connected. The metal ring 59 surrounds the carbon or other suitable contact point 63 of the upper contact. The lower portion of the upper contact carrier 58 is pivoted at 64 to one end of an upper link 66 the other end of which is pivoted at 67 to the bracket 23.

Intermediately fulcrumed at 68 on said bracket is a lower rocking lever 69. One end of this lower rocking lever is pivoted at 72 to the lower end of a vertical link 73 the upper end of which is pivoted at 74 to the upper rocking lever 54 as seen in Fig. 1.

Also pivoted upon the pivoted pin 72 is an oscillatory pawl element comprising a tubular sleeve 76 which is adapted to oscillate about the pivotal point 72. Through this sleeve passes the shank 77 of a pawl head 78. Surrounding the shank 77 between the head 78 and the tubular sleeve is a coiled spring 79 which absorbs any jar on the pawl when in operation.

The lower end 81 of the shank 77 is threaded and engages a nut 82 by which the spring 79 may be compressed and the position of the pawl head in relation to the sleeve 76 may be adjusted. The lower end of the oscillatory pawl element engages a pawl returning cam 83 which is stationary and may form part of the bracket 23 as shown.

Outstanding from said bracket is a projection 84 through which passes an adjustable limiting screw 86 held in the desired position by a set screw 87. The function of this limiting screw is to limit the upward movement of the pawl by engaging the head thereof between the end of the screw and the ratchet wheel as shown in dotted lines in Fig. 1. By this means the distance through which the ratchet wheel and the film carrier are turned by the pawl may be regulated.

Outstanding from the lower rocking lever 69 is a contact actuating pin 88 which is adapted to engage the minor arm 89 of a contact actuating lever which is fulcrumed at 91 on the bracket 23 and is provided with a major arm 92 adapted to engage the lower end of a slidable contact stem hereinafter described.

Pivoted at 93 to the lower rocking arm 69 is a tubular guide 94 which is similarly pivoted at 96 to one end of a lower link 97 the other end of which is pivoted at 98 to the bracket 23.

Slidably accommodated within the tubular guide 94 is a slidable contact stem 99 the lower end 101 of which is adapted to engage the end of the lever arm 92 before described. The upper portion of the stem 99 is provided above the guide 94 with a collar or shoulder 102.

Carried by the upper end of slidable stem 99 and insulated therefrom as at 103 is a lower sliding contact comprising a metal ring 104 which is provided with a lug 106 for connection to a conductor 107 passing to a terminal hereinafter described. The metal ring 104 surrounds a carbon or other suitable contact point 108 which is adapted to periodically engage the upper contact point 63 to intermittently energize the solenoid.

Figure 7:
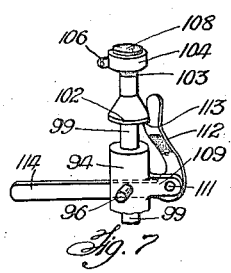
Fig. 7 is a perspective view on an enlarged scale of a lower or slidable contact and a catch device by which it is held in its upward or contacting position.
Figure 8:
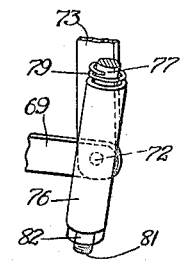
Fig. 8 is a perspective view on an enlarged scale of portion of an oscillatory pawl element showing its pivotal connection to a lower rocking lever and the lower end of a vertical link connected thereto.

Outstanding from the tubular guide 94 is a lug 109 (Fig. 7) to which is pivoted at 111 a bell crank lever, one arm 112 of which is provided with a catch 113 adapted to drop beneath the collar or shoulder 102 of the slidable stem 99 thereby holding the upper and lower contacts in engagement as seen in full lines in Fig. 1, while the solenoid is being energized. The other arm 114 of said bell crank lever is adapted to intermittently engage a tripper 116 which automatically withdraws the catch from beneath the shoulder 102 and allows the lower contact to drop from the upper contact thereby deënergizing the solenoid.

Pivoted at 117 to the lower rocking arm 69 is the upper end of a connecting rod 118 which is pivoted at its lower end to the plunger 119 of a dashpot the cylinder of which is indicated at 121 and is provided with an enlarged upper end 122 as seen in Fig. 1. Formed through the plunger 119 is an oil passage 123 having an upper enlargement 124 and a valve seat 126. Upon this seat an internal ball valve 127 normally rests during the upward movement of the plunger thereby closing the oil passage 123. During the downward movement of the plunger the ball 127 rises from its seat and opens the passage 123 the upward movement of the ball being limited by a cross pin or stop 128 inserted through the plunger.

Passing from the upper to the lower end of the dashpot cylinder 121 is a bypass 129 having a regulating tap or valve 131 by which the passage of oil through said bypass may be regulated. By this means the time occupied by the solenoid on its downward or return stroke and the consequent period of exposure of each sign or exhibit may be readily adjusted in accordance with requirements.

The numerals 132 and 133 indicate two terminals attached to the partition 16 and connected with leading in wires 134 by which the electric current to operate the apparatus is led from any convenient source of supply. A switch 136 is interposed in one of the leading in wires and enables the apparatus to be readily started or stopped when desired. A conductor 137 leads from the terminal 133 to one end of the solenoid winding so that when the contact points 63 and 108 are in engagement a circuit is completed through the wires 134, the terminals 132 and 133 the lamp 9, conductor 137, solenoid winding 47, conductor 62, contacts 63 and 108, and the conductor 107 connected with the terminal 132.

To enable the light from the lamp 8 to be interrupted or obscured and the illumination of the display screen 4 temporarily stopped while the signs or exhibits are changing, suitable means, such as a shutter 139 is employed. This shutter is adapted to be intermittently brought in front of the hole 22 in the lens tube each time a new film or plate 34 is being brought between the lamp and the lenses. This shutter may be operated by any convenient means such as shown in Fig. 1 where 141 indicates a shutter arm which is fulcrumed at 142 and carries at one end the shutter 139 and at its other end a counterweight 143 which is adapted to normally hold the shutter in the position shown in full lines in Fig. 1 and away from the opening 22 in the lens tube. In this normal position the arm 141 rests upon the limit stop 144. To operate the shutter the operating rod 52 is provided with a spring tappet 146 adapted to engage the counterweight end of the arm 141 and lift said end as the solenoid moves on its upward stroke. This moves the shutter into the position shown in dotted lines in Fig. 1 thereby obscuring the light from the lamp while the film carrier is being moved to bring a new exhibit into position for display. Immediately the solenoid reaches the end of its upward stroke and the film or plate is thus changed the shutter is returned to normal position by the counterweight 143 as the adjacent end of the arm 141 is released by the spring tappet 146 as in dotted lines in Fig. 1. This tappet is of such a nature that although it will lift the arm 141 on the up stroke of the solenoid it springs back and passes beneath said arm on the downward stroke the weight of the core 49 and jacket 48 being sufficiently heavy to overcome the resistance of the arm 141 to the downward movement of the tappet. It will be obvious that a spring may be used in place of the counterweight if so desired.

It will be evident from the foregoing that when the light is obstructed in the above manner and the glass screen 4 is consequently unilluminated the advertisement or sign upon the veil screen 7 is clearly visible thereby enabling an unilluminated sign to be intermittently displayed while the luminous signs are changing. The texture of the material forming the veil screen renders it for all practical purposes invisible when the illuminated signs are being displayed.

It will be evident that the veil screen and the shutter or light interrupting mechanism may be dispensed with if desired also that although the sign on the veil screen has been referred to as an unilluminated sign it may if desired be illuminated from the front by a light or lights to illuminate the veil screen while the display screen 4 is darkened as above mentioned.

The invention operates as follows:—
Assuming the parts to be in normal position as shown in full lines in Fig. 1 the energization of the solenoid causes the lower movable core and jacket 48 to move upwardly thereby raising the operating rod 52. It may be here mentioned that the function of the movable jacket 48 is to increase the electromagnetic attraction of the solenoid as the core moves upwardly. This permits of the employment of a solenoid of considerably smaller size than would otherwise be required. The upward movement of the operating rod 52 and the right hand end of the upper rocking lever 54 causes the link 73 and the right hand end of the lower rocking lever 69 to be raised and the left hand ends of said levers to be depressed as shown in dotted lines in Fig. 1. This action causes the pawl to move the ratchet wheel 38 for the space of one tooth and the film carrier 5 on the ratchet wheel a corresponding amount. The pawl is now arrested by the limiting screw 86 and the next film or plate is disposed between the lamp and the lenses the device inscribed on such film or plate being thus projected onto the glass screen 4. It will be obvious however that by a suitable arrangement of lenses the exhibit instead of being displayed on the screen 4 may be projected on to a canvas or other screen located at a distance from the apparatus.

As the solenoid reaches the upward limit of its travel the arm 114 of the bell crank lever engages the tripper 116 causing the catch to be moved from beneath the collar or shoulder 102 of the slidable stem of the lower contact. This causes the latter to drop by gravity through the tubular guide 94 thereby breaking the solenoid circuit and causing the lower movable core and jacket 48 to fall by gravity. The time taken by said core and jacket in reaching their lowermost position as in Fig. 1, and consequently the period of exposure of each luminous exhibit depends upon the rate at which the oil passes from the upper to the lower end of the dashpot cylinder through the by-pass 129 and may be readily varied by opening the regulating valve 131 to a greater or lesser degree. During the upward movement of the solenoid and consequently the downward movement of the dashpot plunger the oil passes from the upper to the lower portion of the dashpot cylinder through the oil passage 123 which is opened by the rising of the ball valve as before mentioned. This allows of a quick upward movement and a slow downward movement of the movable parts of the solenoid and the operating rod 52.

As the movable core of the solenoid reaches its lowermost position the lower end of the oscillatory pawl element engages the pawl returning cam 83 which causes the pawl to be swung back about the pivot 72 into the position seen in full lines in Fig. 1 to engage the next tooth of the ratchet wheel in readiness for the next forward movement thereof when the solenoid is again energized. Simultaneously the downward pressure of the contact actuating pin 88 upon the minor arm 89 of the contact actuating lever causes the major arm 92 of said lever to raise the slidable contact stem 99 through the tubular guide 94 and the lower sliding contact point to be moved into engagement with the upper contact point thereby again energizing the solenoid and causing another film or plate to be brought between the lamp and lenses for display.

It will be evident that apart from the slidable movement of the lower contact both this contact and the upper contact move in unison with the rocking levers and links also that although the solenoid is intermittently energized current passes continually to the lamp 8.

The invention provides a luminous intermittent display apparatus which is highly reliable and efficient and being of compact construction may be easily transported from place to place. The invention is particularly adapted for use in such places as shop windows but it will be obvious that it may be applied to various other different uses such as displaying advertisements or signs in hotels, cafés, theaters, street cars and other public places or for illustrating lectures or addresses. In any of its applications the invention requires no other operating energy than that provided by an ordinary electric current service to which the apparatus may be readily connected by a wall plug or socket connection of the usual type. Moreover the apparatus will operate positively and indefinitely without manual attention other than the manipulation of the switch 136 to start and stop the working of the device and the adjustment of the valve 131 when it is desired to vary the period of display of the exhibits.

Having now described my invention what I claim as new and desire to secure by Letters Patent is:—

1. In a luminous display apparatus an illuminating medium, a film carrier holding a series of films or plates bearing the signs to be displayed, a solenoid, having a movable core adapted to be operated in one direction by electric energy to successively move the films or plates into position to project their sign onto the display screen, and in a reverse direction by gravity while a sign is being displayed, means for intermittently energizing the solenoid, a dashpot, a plunger within the dashpot cylinder, said plunger having therethrough an oil passage, a ball valve to normally close the oil passage, means for limiting the upward movement of the ball valve and a regulating tap whereby the escape of oil from one end of the dashpot cylinder is controlled to regulate the period occupied by the core in its return or gravity operated stroke.

2. In a luminous display apparatus the combination of a solenoid, an illuminating medium, a projecting device, a film carrier holding a series of films or plates bearing the signs to be exhibited, means actuated by the solenoid to intermittently move the films or plates between the illuminating medium and the projecting device, means for intermittently energizing the solenoid and comprising a pair of coöperating contacts which are adapted to move bodily in unison with the core of the solenoid and means actuated by the solenoid to independently move one of said contacts relatively to the other to complete an electric circuit and thus energize the solenoid.

3. In a luminous display apparatus the combination of a film carrier, supporting a series of films or plates bearing the signs to be exhibited, an illuminating medium, an electro-magnet adapted to intermittently move the film carrier between the illuminating medium and a display screen, means for intermittently energizing the electro-magnet, said last named means including an upper contact and a lower sliding contact adapted to normally fall out of engagement with the upper contact by gravity, and means actuated by the electro-magnet to intermittently raise said sliding contact into engagement with the upper contact to energize said magnet.

4. In a luminous display apparatus the combination of a film carrier, supporting a series of films or plates bearing the signs to be exhibited, an illuminating medium, an electro-magnet adapted to intermittently move the film carrier between the illuminating medium and a display screen, means for intermittently energizing the electro-magnet, said last named means including an upper contact, a vertical guide adapted to be moved in unison with said upper contact by the electro-magnet, and a lower sliding contact adapted to move in said guide and to normally fall out of engagement with the upper contact by gravity, and means actuated by the electro-magnet to intermittently raise said sliding contact into engagement with the upper contact to energize said magnet.

5. In a luminous display apparatus the combination of a film carrier, holding a series of films or plates bearing the signs to be displayed, an illuminating medium, an electro-magnet adapted to intermittently move the film carrier between the illuminating medium and a display screen, means for intermittently energizing the electro-magnet, said last named means including an upper contact, a guide adapted to be moved in unison with the upper contact by the electro-magnet, a lower sliding contact adapted to normally fall out of engagement with the upper contact by gravity, said sliding contact comprising a stem which passes through said guide and a contact point carried by the upper end of said stem, a shoulder on said stem and adapted to normally rest upon the upper end of the guide to limit the downward movement of the sliding contact, and means actuated by the electro-magnet to intermittently raise the sliding contact into engagement with the upper contact to energize the magnet.

6. In a luminous display apparatus the combination of a film carrier, holding a series of films or plates bearing the signs to be displayed, an illuminating medium, an electro-magnet adapted to intermittently move the film carrier between the illuminating medium and a display screen, means for intermittently energizing the electro-magnet, said last mentioned means including an upper contact, a lower contact adapted to be normally disengaged from the upper contact, a shoulder or projection carried by the lower contact, a catch adapted to engage said shoulder to hold the two contacts in engagement while the solenoid is energized, means to automatically release said catch to separate the contacts when the solenoid is to be deënergized, and means actuated by the electro-magnet to intermittently move the lower contact into engagement with the upper contact to energize the magnet.

7. In a luminous display apparatus the combination of a film carrier, supporting a series of films or plates bearing the signs to be exhibited, an illuminating medium, an electro-magnet adapted to intermittently move the film carrier between the illuminating medium and a display screen, means for intermittently energizing the electro-magnet, said last named means including an upper contact, a guide adapted to be moved in unison with the upper contact by the electro-magnet, a lower contact adapted to normally fall out of engagement with the upper contact by gravity, said lower contact comprising a stem which passes through said guide and a contact point carried by the upper end of said stem, a catch adapted to hold the two contacts in engagement while the solenoid is energized, a tripper adapted to actuate the catch to release the contacts from engagement, and means actuated by the electro-magnet to intermittently raise the lower contact into engagement with the upper contact to energize the magnet.

8. In a luminous display apparatus the combination of a film carrier, supporting a series of films or plates bearing the signs to be displayed, an illuminating medium, an electro-magnet adapted to intermittently move the film carrier between the illuminating medium and a display screen, means for intermittently energizing the electro-magnet, said last named means including an upper contact and a lower sliding contact adapted to normally fall out of engagement with the upper contact by gravity, and means actuated by the electro-magnet to intermittently raise the lower sliding contact into engagement with the upper contact to energize said magnet, said last named means comprising a lever actuated by movement of the electro-magnet and adapted to engage and raise the sliding contacts into engagement with the upper contact as the solenoid moves in one direction and to allow the sliding contact to fall out of engagement with the upper contact as the solenoid moves in the opposite direction.

9. In a luminous display apparatus a film carrier, supporting a series of films or plates bearing the signs to be exhibited, an illuminating medium, means for moving the film carrier to bring the films or plates successively between the illuminating medium and a display screen, said means comprising a pawl and ratchet mechanism including a ratchet wheel, an oscillatory pawl element adapted to engage said ratchet wheel and a pawl returning cam adapted to oscillate said pawl element about its pivotal point to return the pawl to its original or normal position after each forward movement of the ratchet wheel.

10. In a luminous display apparatus a film carrier holding a series of films or plates bearing the signs to be exhibited, an illuminating medium, means for intermittently moving the film carrier to bring the films or plates successively between the illuminating medium and a display screen, said means comprising a pawl and ratchet mechanism including a ratchet wheel; an oscillatory pawl element comprising a sleeve, a pawl shank passing through said sleeve, a pawl head carried by said shank, adapted to engage the ratchet wheel, a coiled spring disposed between said pawl head and the adjacent end of the sleeve and means adapted to oscillate the pawl element about its pivotal point to return the pawl to its original or normal position after each forward movement of the ratchet wheel.

11. In a luminous display apparatus a film carrier, holding a series of films or plates bearing the signs to be exhibited, an illuminating medium, means for intermittently moving the film carrier to bring the films or plates successively between the illuminating medium and a display screen, said means comprising a pawl and ratchet mechanism including a ratchet wheel, an oscillatory pawl element adapted to engage the ratchet wheel, means adapted to oscillate said element about its pivotal point to return the pawl to its original or normal position after each forward movement of the ratchet wheel and an adjustable limiting screw adapted to engage the pawl at the end of each such forward movement thereof for the purpose specified.

12. In a luminous display apparatus the combination of a solenoid, rocking levers actuated by said solenoid, a pair of coöperating contacts carried by said rocking levers and adapted to be intermittently engaged to energize the solenoid, a film carrier, an illuminating medium, an oscillatory pawl element operated by said levers to intermittently move the film carrier between the illuminating medium and a display screen, means to oscillate said pawl element after each forward movement thereof, a dashpot adapted to retard the return movement of the solenoid when the latter is deënergized and a regulating valve adapted to control the flow of oil from one end of the dashpot cylinder to the other whereby the period occupied in the return movement of the solenoid, may be manually adjusted for the purpose set forth.

13. In a luminous display apparatus the combination of a solenoid having a movable core adapted to be moved upwardly by electro-magnetic energy and downwardly by gravity, an operating rod attached to said core, an upper rocking lever connected to said operating rod, a lower rocking lever, a film carrier, an illuminating medium, and connected with said upper rocking lever, a pawl and ratchet wheel operatively connected with the rocking levers whereby the film carrier is intermittently moved between the illuminating medium and a display screen, an upper contact carried by the upper rocking lever, a vertical guide carried by the lower rocking lever, a lower sliding contact adapted to move within said guide, a contact actuating lever adapted to lift the lower contact into engagement with the upper contact on the downward or return movement of the solenoid, means to retain said contacts in engagement with each other during the upward movement of the solenoid and to separate them at the end of such upward movement and means to variably retard the downward movement of the solenoid for the purpose set forth.

14. In a luminous display apparatus the combination with an illuminating medium, and means including a film carrier and an operating solenoid for intermittently and automatically displaying a succession of luminous signs or exhibits on a display screen, of a shutter, and a pivoted arm carrying said shutter and operated by said solenoid to move said shutter into position between the illuminating medium and a display screen alternately with each luminous display and means to return the shutter to normal or unobstructive position for the purpose set forth.

In testimony whereof I affix my signature.
L. B. BUCHNER.

Witness:
JACK NANCE.